United States Patent
Kojima et al.

[11] Patent Number: 6,057,893
[45] Date of Patent: May 2, 2000

[54] PICTURE ENCODING METHOD, PICTURE ENCODING APPARATUS, PICTURE TRANSMITTING METHOD AND PICTURE RECORDING MEDIUM

[75] Inventors: Takashi Kojima; Motoki Kato, both of Kanagawa, Japan

[73] Assignee: Sony Corporation, Tokyo, Japan

[21] Appl. No.: 08/774,917

[22] Filed: Dec. 27, 1996

[30] Foreign Application Priority Data

Dec. 28, 1995 [JP] Japan .................................. 7-344160

[51] Int. Cl.[7] ...................................................... H04N 5/14
[52] U.S. Cl. ........................... 348/700; 348/699; 348/416
[58] Field of Search .................................. 348/402, 403, 348/411, 413, 415, 416, 699, 409, 395, 420, 700, 407; 386/111; 382/236, 238; 375/240; H04N 5/14

[56] References Cited

U.S. PATENT DOCUMENTS

| | | | |
|---|---|---|---|
| 5,227,878 | 7/1993 | Puri et al. ................................ | 348/416 |
| 5,231,484 | 7/1993 | Gonzales et al. ....................... | 348/405 |
| 5,267,334 | 11/1993 | Normille et al. ....................... | 348/401 |
| 5,481,553 | 1/1996 | Suzuki et al. .......................... | 348/403 |
| 5,488,482 | 1/1996 | Ueda et al. ............................. | 348/402 |
| 5,504,530 | 4/1996 | Obikane et al. ........................ | 348/413 |
| 5,561,465 | 10/1996 | Fautier et al. .......................... | 348/415 |
| 5,565,920 | 10/1996 | Lee et al. ................................ | 348/398 |
| 5,574,504 | 11/1996 | Yagasaki et al. ....................... | 348/415 |
| 5,589,884 | 12/1996 | Ohguchi .................................. | 348/405 |
| 5,614,945 | 3/1997 | Sekine et al. ........................... | 348/208 |
| 5,619,425 | 4/1997 | Cookson et al. ........................ | 348/18 |
| 5,621,464 | 4/1997 | Teo et al. ................................ | 348/390 |
| 5,640,208 | 6/1997 | Fujinami ................................. | 348/413 |
| 5,701,160 | 12/1997 | Kimura et al. .......................... | 348/413 |
| 5,717,462 | 2/1998 | Hayashi ................................... | 348/416 |
| 5,774,593 | 6/1998 | Zick et al. ............................... | 348/403 |

FOREIGN PATENT DOCUMENTS

| | | |
|---|---|---|
| 3-66272 | 3/1991 | Japan .............................. H04N 5/92 |
| 66272 | 3/1991 | Japan . |

*Primary Examiner*—Bryan Tung
*Assistant Examiner*—Gims S. Philippe
*Attorney, Agent, or Firm*—Frommer Lawrence & Haug, LLP; William S. Frommer; Dennis M. Smid

[57] ABSTRACT

A picture encoding method in which an input picture signal is encoded in a pre-set sequence by one of a plurality of encoding modes including at least the intra-frame coding and forward predictive coding for generating encoded data including intra-frame coded picture and forward predictive-coded picture. The scene changes in the input image signals are detected, the forward predictive-coded image directly after a detected scene change is changed to an intra-frame coded image, while at least one of intra-frame coded pictures before and after the detected scene change is changed to a forward predictively coded image. This prohibits the picture from becoming degraded in quality due to scene change. In addition, the intra-frame coded picture with a significant amount of the encoding bits may be prevented from being increased in number so that the amount of the transmission of the information may be prevented from being increased thereby improving the picture quality with minimum effect on bit allocation such as variable rate bit allocation.

20 Claims, 13 Drawing Sheets

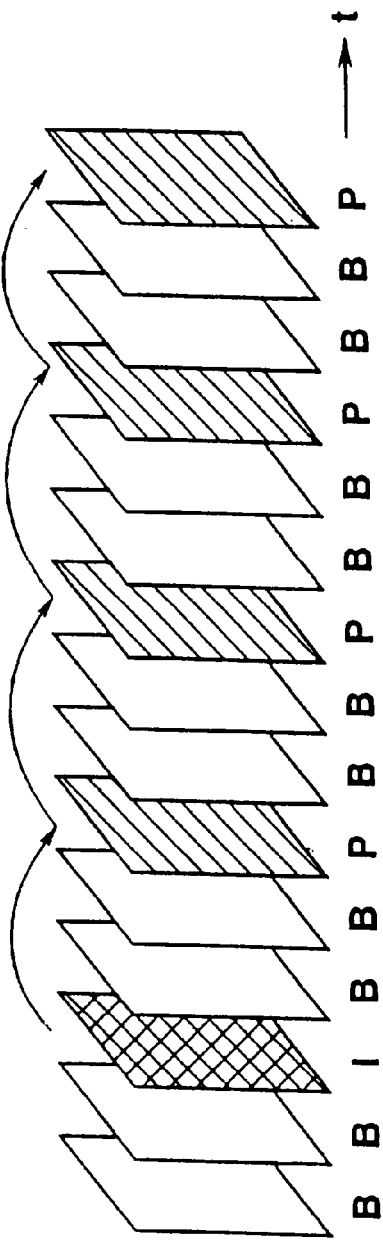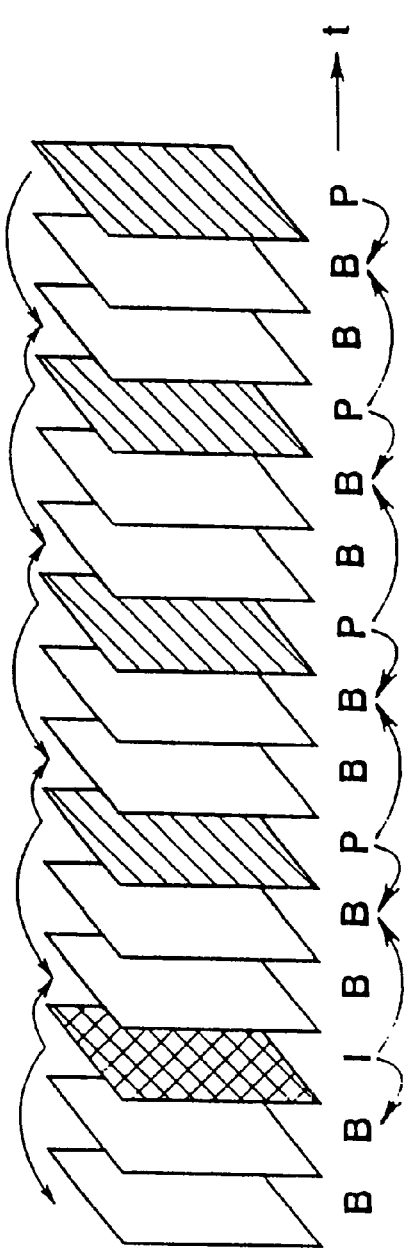
FIG.1A
FIG.1B

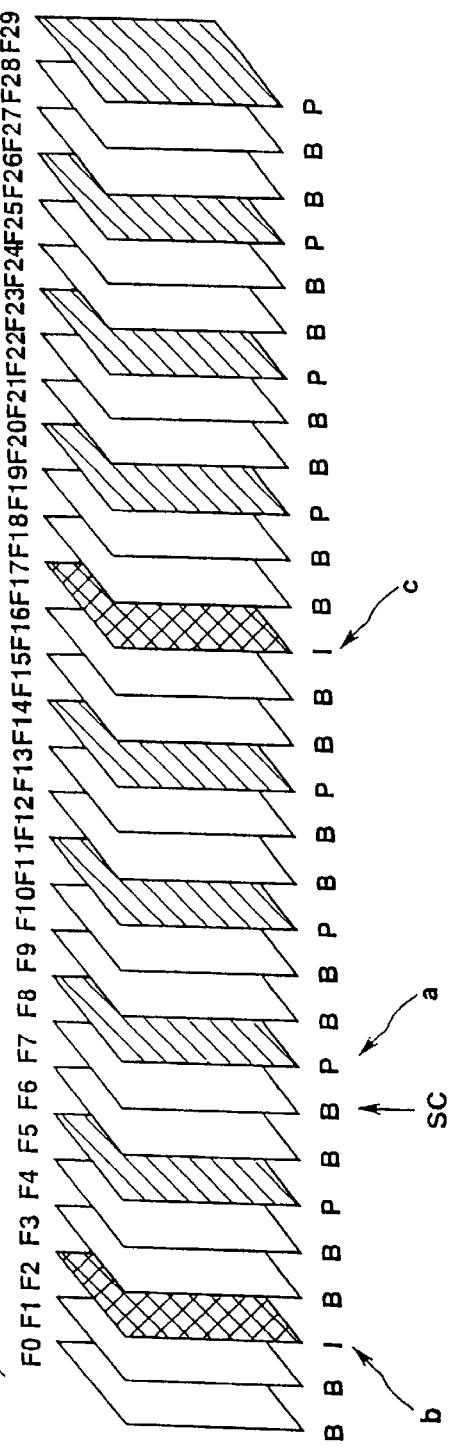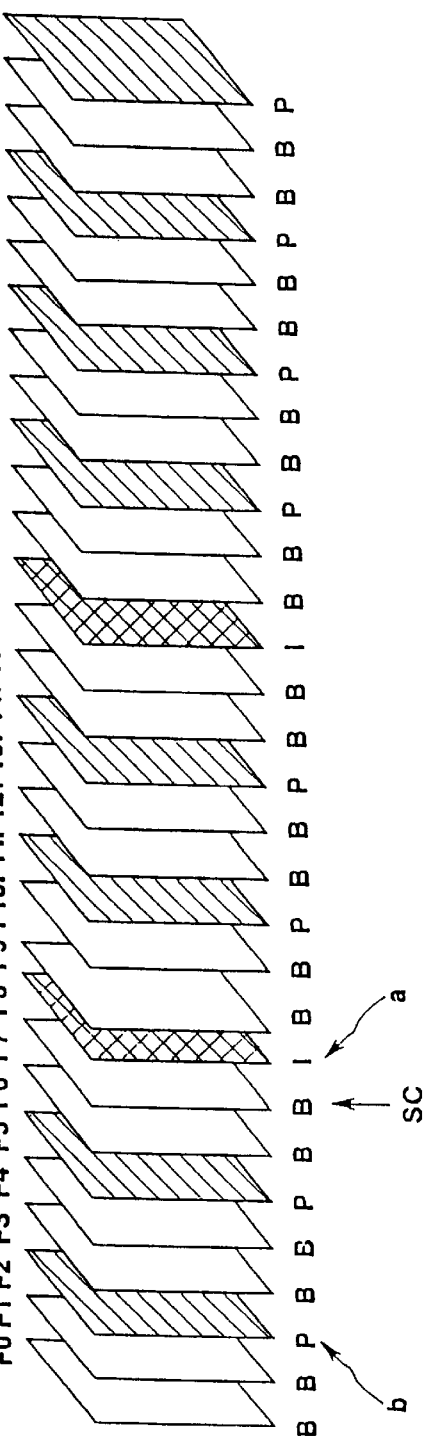
FIG.4A
FIG.4B

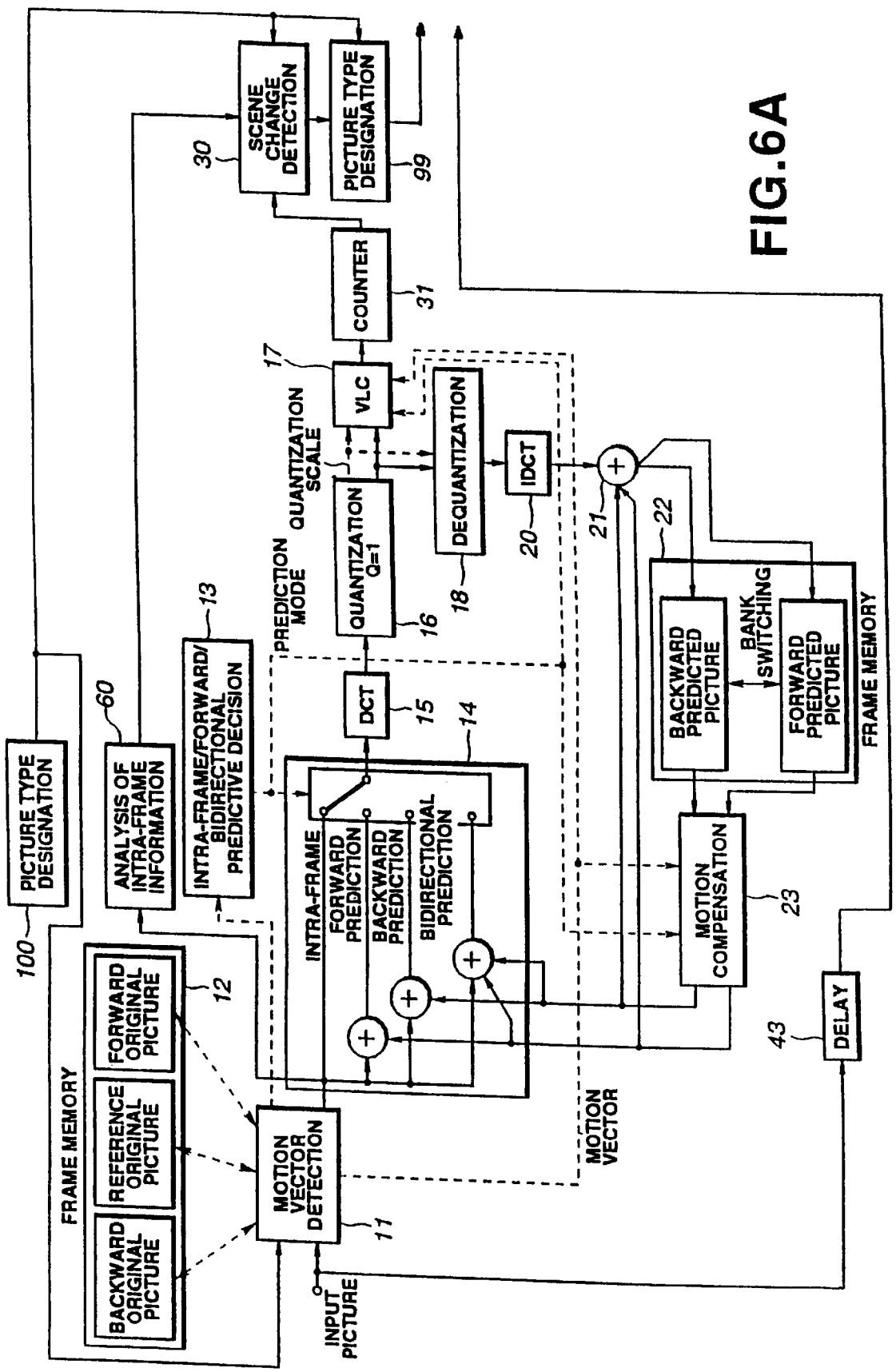

PICTURE ENCODING METHOD, PICTURE ENCODING APPARATUS, PICTURE TRANSMITTING METHOD AND PICTURE RECORDING MEDIUM

BACKGROUND OF THE INVENTION

1. Field of the Invention

This invention relates to a picture encoding method and apparatus, a picture transmitting method and a picture recording medium that may be decoded by a picture decoding apparatus. More particularly, it relates to a picture encoding method and apparatus, a picture transmitting method and a picture recording medium employed in a system for storing image signals of a moving picture in the form of codes for storage on a picture recording medium, such as an optical disc, a magnetic disc or a magnetic tape.

2. Description of the Related Art

In digitally recording picture data on a magneto-optical disc or a magnetic tape, or transmitting the picture data via a pre-set transmission medium, the customary practice is to encode data for compressing and diminishing the data volume.

The case of using the encoding standard by the Moving Picture Image Coding Experts Group (MPEG) as the encoding standard is explained. The MPEG, discussed in ISO-IEC/JTC1/SC2/WG11 and proposed as a standard, is of a hybrid system consisting in the combination of motion-compensated predictive encoding and discrete cosine transform (DCT), as proposed in, for example, the U.S. Pat. No. 5,155,593 by the present Assignee.

In the encoding by the MPEG system, each video sequence is divided into plural GOPs on, for example, the 15-frame basis. Each frame is classified by the prediction system into three sorts of picturers, namely an intra-frame coded picture, encoded within a frame itself, a predictive-coded picture or a P-picture, in which motion prediction is made from past and future P- or I-pictures, and a bidirectionally predictive-coded picture or B-picture, in which motion prediction is made from a past or future P- or I-picture.

In the data compression method according to the MPEG system, a picture of each frame is predicted in accordance with the prediction mode for the I-picture, P-picture or the B-picture, and the prediction error is encoded and transmitted. Basically, only the prediction error is transmitted, thus enabling the data volume to be compacted as compared to the case in which picture data of each frame is transmitted directly.

FIGS. 1A and 1B show a typical structure of a GOP (group-of-pictures) as a picture group structure including at least one I-picture. The frame number in the GOP denotes the display sequence.

In FIGS. 1A and 1B, image signals of 15 frames of from frame F0 to F14 make up a GOP (group-of-pictures) as a processing unit. In the drawings, frames denoted as "I", "P" and "B" denote frames encoded as the above I-, P- and B-pictures, respectively. For a frame of the I-picture, the picture information is encoded by itself and transmitted (intra-frame coding). For a frame of the P-picture, basically a frame of an I- or P-picture temporary previous to a picture under consideration is used as a prediction picture, and prediction residual signals are encoded and transmitted (forward or backward predictive coding). For a picture of a B-picture, basically a reference temporally past frame and a temporally future reference picture are used as prediction pictures and prediction residual signals are encoded and transmitted (bidirectional predictive coding).

If, in a series of transmitted pictures, a scene change, in which a scene or background is changed, occurs, and a picture after the scene change is predicted from a picture before the scene change, the prediction error becomes very large, such that the predicted picture is degraded in picture quality. If the frame thus degraded in picture quality is used as a prediction picture in compressing picture data of an other frame, picture data of such other frame is also degraded in picture quality.

Thus, in the conventional practice, an I-picture is inserted directly after scene change, as shown in FIGS. 2A and 2B, and such new I-picture is used as a reference frame for the subsequent processing for preventing propagation of picture quality degradation.

That is, if scene change SC occurs in a frame F7, a picture a of a frame F8 directly succeeding the scene change is changed to an I-picture, as shown in FIG. 2B.

However, in this case, the number of I-pictures is increased with the increase number of scene changes, resulting in an increased number of I-pictures in a given sequence. Since image signals for one frame are directly transmitted for the I-picture, a large information volume is required for transmission, such that the increased number of the I-pictures leads to lower compression efficiency and degraded picture quality.

SUMMARY OF THE INVENTION

It is therefore an object of the present invention to provide a picture encoding method and apparatus, a picture transmitting method and a picture recording medium wherein the picture quality of the predicted picture is not degraded in case of scene changes.

In one aspect, the present invention provides a picture encoding method in which an input picture signal is encoded in a pre-set sequence by one of a plurality of encoding modes including at least the intra-frame coding and forward predictive coding, for generating encoded data including intra-frame coded picture and forward predictive-coded picture. The method includes the steps of detecting a scene change in the input picture signal, encoding the input image signal in accordance with at least one of the plural encoding modes including at least the intra-frame coding and forward predictive coding, and changing the forward predictive-coded picture directly after the detected scene change to an intra-frame coded picture while changing at least one of the intra-frame decoded pictures before and after the detected scene change to a forward predictive coded picture.

In another aspect, the present invention provides picture encoding apparatus in which an input picture signal is encoded in a pre-set sequence by one of a plurality of encoding modes including at least the intra-frame coding and forward predictive coding, for generating encoded data including an intra-frame coded picture and a forward predictive-coded picture. The apparatus includes means for detecting a scene change in the input picture signal, means for encoding the input image signal in accordance with at least one of the plural encoding modes including at least the intra-frame coding and forward predictive coding, and means for changing the forward predictive-coded picture directly after the detected scene change to an intra-frame coded picture while changing at least one of the intra-frame decoded pictures before and after the detected scene change to a forward predictive coded picture.

In still another aspect, the present invention provides a picture transmitting method in which an input picture signal is encoded in a pre-set sequence by one of a plurality of encoding modes including at least the intra-frame coding and forward predictive coding, for generating encoded data including an intra-frame coded picture and a forward predictive-coded picture, and for transmitting the generated the encoded data. The method includes the steps of detecting a scene change in the input picture signal, encoding the input image signal in accordance with at least one of the plural encoding modes including at least the intra-frame coding and forward predictive coding, for generating encoded data including both the intra-frame coded pictures and the forward predictively-coded pictures, and changing the forward predictive-coded picture directly after the detected scene change to an intra-frame coded picture while changing at least one of the intra-frame decoded pictures before and after the detected scene change to a forward predictive coded picture for generating modified encoded data, and transmitting the modified encoded data as transmission data.

In yet another aspect, the present invention provides a recording medium decodable by a decoding apparatus and having thereon recorded signals decodable by the decoding apparatus. The recorded signals are signals generated by the steps of detecting a scene change in the input picture signal, encoding the input image signal in accordance with at least one of the plural encoding modes including at least the intra-frame coding and forward predictive coding for generating encoded data including both the intra-frame coded pictures and the forward predictively-coded pictures, and changing the forward predictive-coded picture directly after the detected scene change to an intra-frame coded picture while changing at least one of the intra-frame decoded pictures before and after the detected scene change to a forward predictive coded picture for generating modified encoded data.

BRIEF DESCRIPTION OF THE DRAWINGS

FIGS. 1A and 1B show an example of a group-of-pictures and picture types in encoding picture data for data compression.

FIGS. 4A and 4B illustrate an example of change of picture types conforming to a scene change.

DESCRIPTION OF THE PREFERRED EMBODIMENTS

Figure 2A:
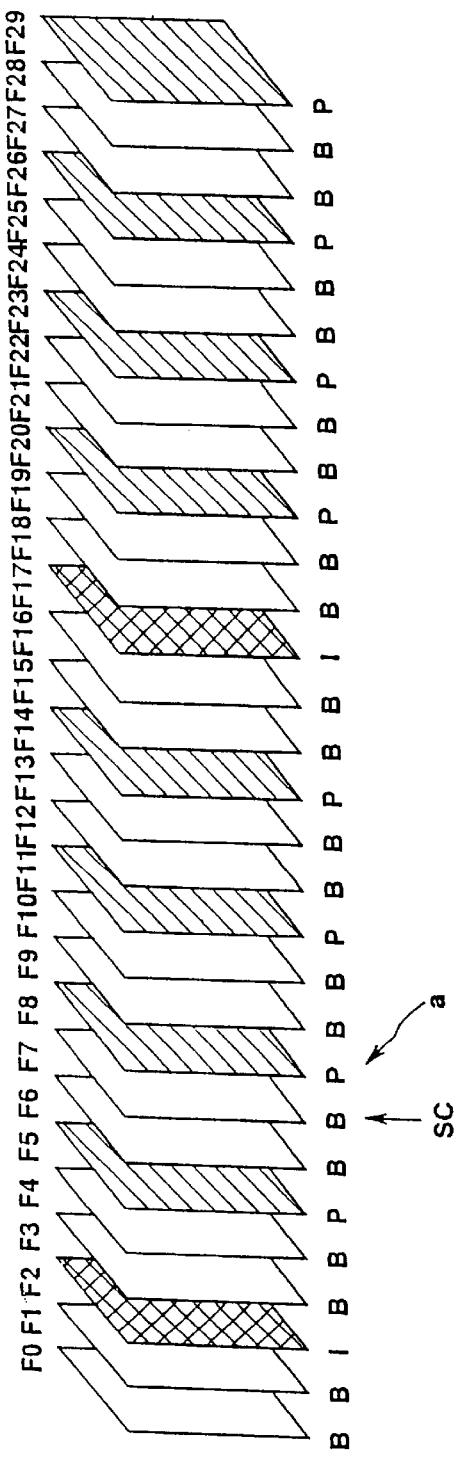
FIGS. 2A and 2B illustrate a conventional example of change of picture types conforming to a scene change.
Figure 2B:
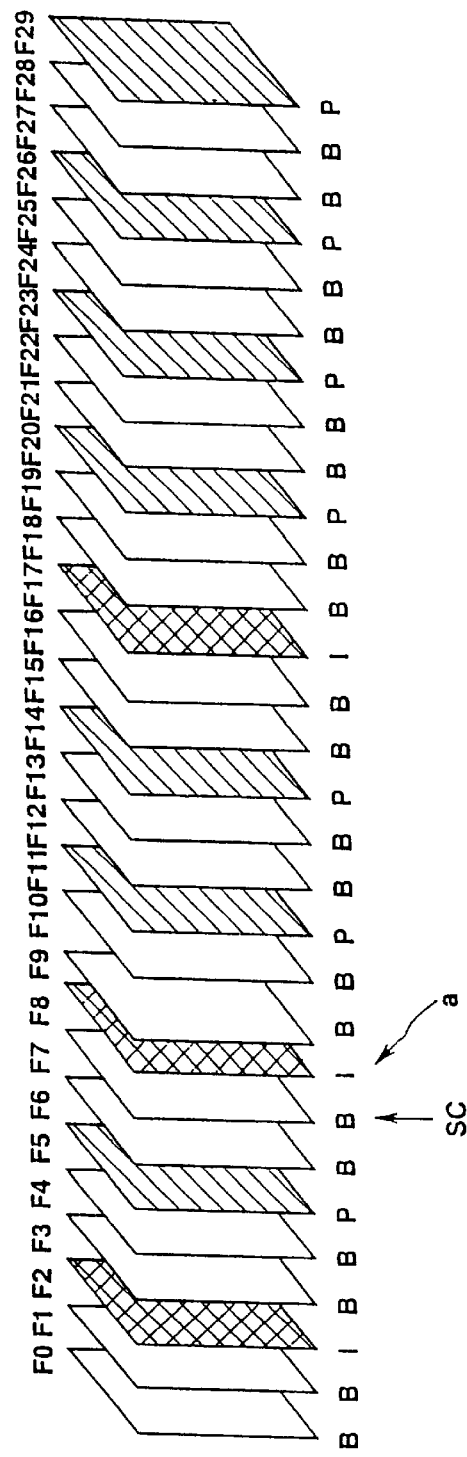

Referring to the drawings, certain preferred embodiments of a picture encoding method and apparatus, a picture transmitting method and a picture recording medium according to the present invention will be explained in detail.

Figure 3:
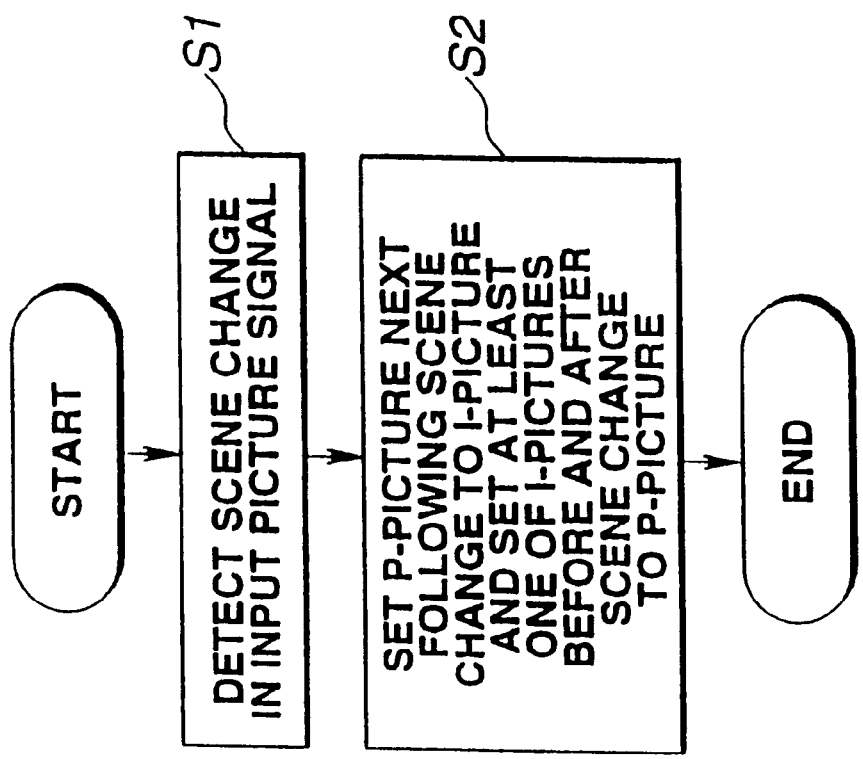
FIG. 3 is a flowchart for illustrating the basic operation of the picture encoding method according to the present invention.

FIG. 3 shows, in a flowchart, the basic operation of the picture encoding method according to the present invention. The present picture encoding method encodes the input image signal by one of plural encoding modes including intra-frame coding, forward predictive coding and bidirectional predictive coding, and outputs the encoded signal.

At step S1 in FIG. 3, a scene change in the input picture signal is detected. At the next step S2, a forward predictive-coded picture (P-picture) directly after the detected scene change is changed to an intra-coded picture (I-picture). Also, at this step S2, at least one of the intra-frame coded pictures (I-pictures) before and after the detected scene change is changed to a forward predictive-coded picture (P-picture). That is, if a scene change has occurred, one or both of the past and future I-pictures is changed to the P-picture and a reference frame after the scene change is changed to an I-picture.

The specified operation at this time is explained by referring to FIGS. 4A, 4B, 5A and 5B.

FIG. 4A shows two, as an example, of the GOPs described above with reference to FIG. 1, wherein the scene change has been detected at a B-picture of a frame F7. At this time, the P-picture which is the reference frame directly after the detected scene change SC, that is picture a of the frame F8, is changed to an I-picture, as shown in FIG. 4B, while a picture b of a frame F2, which is the past I-picture, before the scene change SC, is changed to a P-picture, as shown in FIG. 4B.

Figure 5A:
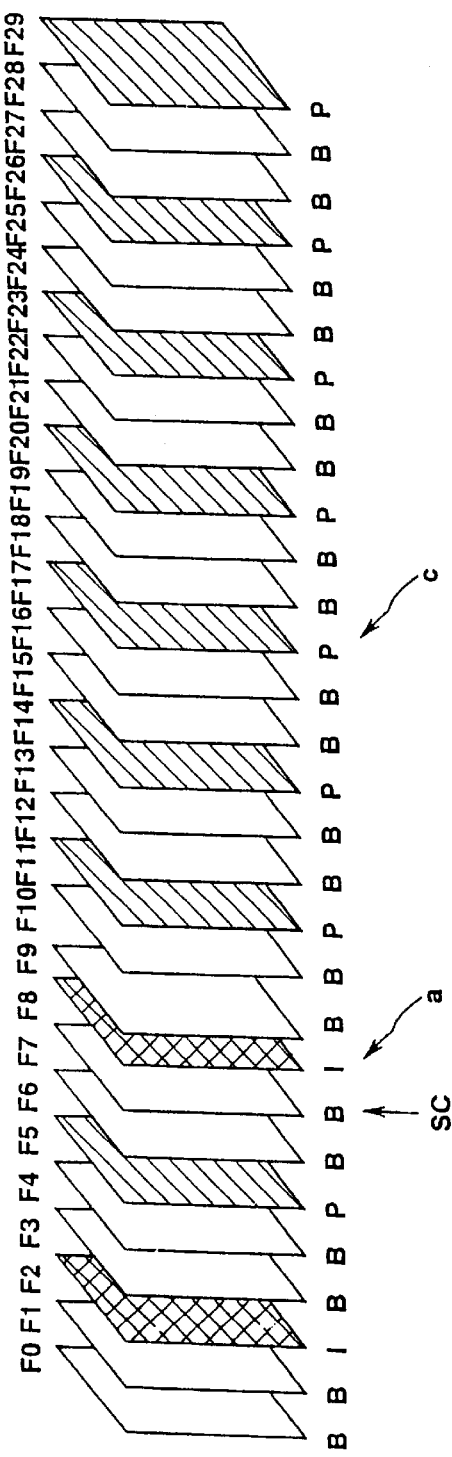
FIGS. 5A and 5B illustrate another example of change of picture types conforming to a scene change.

As a modification, a picture c, which is a future I-picture, in place of the picture b as a past I-picture with respect to the future I-picture, may be changed to a P-picture, as shown in a frame sequence shown in FIG. 5A. In the example of FIG. 5A, the picture a, which is the P-picture directly after the scene change SC of FIG. 4A, is changed to an I-picture, while the picture c, which is a future I-picture relative to the scene change SC, is changed to a P-picture.

Figure 5B:
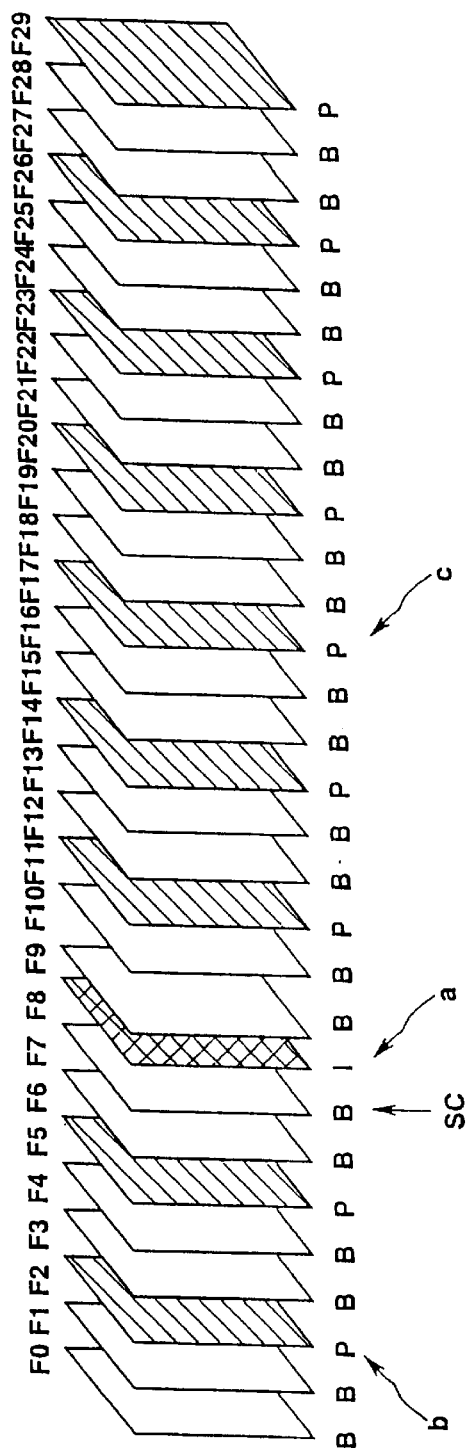

As a further modification, both the pictures b and c, which are past and future I-pictures with respect to the scene change of FIG. 4A, may be changed to P-pictures, as shown in FIG. 5B. That is, in the example of FIG. 5B, the picture a, which is the P-picture directly after the scene change SC of FIG. 4A, is changed to an I-picture, while both the pictures b and c, which are past and future pictures with respect to the scene change SC, are changed to P-pictures.

If there is an I-picture directly after the scene change, before a P-picture, the above change is unnecessary.

By making such picture type changes, it becomes possible to array an I-picture directly after a scene change to prevent propagation of picture quality degradation. Moreover, since the overall rate of the I-pictures is not increased, the compression efficiency may be prevented from being lowered.

Figure 6B:
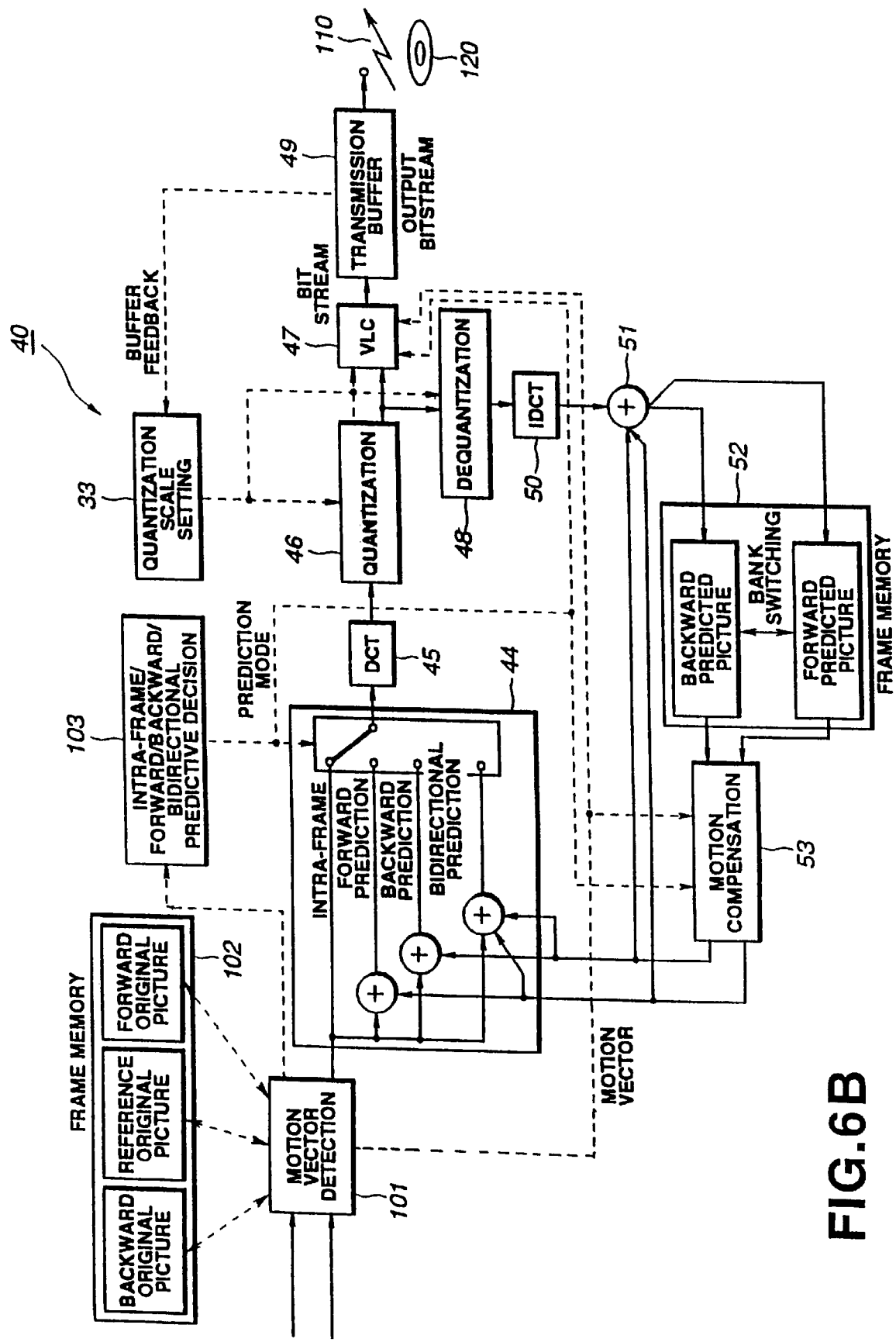
FIG. 6 is a block diagram showing an example of a picture encoding apparatus embodying the present invention.

Referring to FIG. 6, an embodiment of a picture encoding apparatus according to the present invention is explained.

The picture encoding apparatus shown in FIG. 6 includes a first encoding circuit 10 for encoding an input image signal for generating first encoded data, and an image analysis or intra-frame information circuit 60 for finding statistic properties of the input image signal or image characteristics. The picture encoding apparatus also includes a scene change detection circuit 30 for detecting a scene change from the amount of data of the first encoded data from the first encoding circuit 10 every preset time duration or from the statistic data or the information of image characteristics of the input image signal from the image analysis or intra-frame information circuit 60, and a picture type designation circuit 99 for determining the picture encoding method every pre-set time duration based on the information from the scene change detection circuit 30. The picture encoding apparatus further includes a second encoding circuit 40 for encoding the input image signal based on the information from the picture type designation circuit for generating second encoded data.

The image analysis or intra-frame information circuit 60 computes the statistic information as to, for example, luminance or flatness, and makes calculations as the information on image characteristics of the input picture.

As for illustrative examples of the information on the image characteristics, an example of the statistic information as to the luminance of the input image is an average value (L) per pre-set time duration of the luminance signal Y. An example of the statistic information on chromaticity of the input image is a an average value (R) per pre-set time duration of a chroma signal Cr. An example of the statistic information on the flatness of the input image is a variance (V) per pre-set time duration of the luminance signal Y, while an example of the statistic information of the amount of motion of the input image is an average value (M) per pre-set time duration of the amount of motion vector.

The first encoding circuit 10 stores input image data, as input image signal, in a set of frame memories 12. The information from the picture type designating circuit 100, specifying the picture type, is supplied to a motion vector detection circuit 11, which then detects the motion vector of the input image data on the macro-block basis based on the image data stored in the frame memory set 12 and the information specifying the picture type. The first encoding circuit 10 also includes a frame memory 22 for storing prediction image data. The prediction image data from the motion vector detection circuit 11 is sent to a motion compensation circuit 23 which then performs motion compensation on the prediction image data based on the motion vector from the motion vector detection circuit 11. A sum of absolute values of macro-block based inter-frame differences from the motion vector detection circuit 11 is sent to an intra-frame/forward/backward/bidirectional prediction decision circuit 13 which then determines the prediction mode from the supplied value of the sum of the absolute values of the inter-frame differences and sends the determined prediction mode to a prediction encoding circuit 14 for controlling a prediction encoding circuit 14 for switching between intra-frame/forward/backward/bidirectional prediction on the block basis.

The prediction encoding circuit 14 receives the motion-compensated prediction image data from the motion compensation circuit 23 and the input image data and computes the difference between the prediction image data and the input image data based on the prediction mode from the prediction decision circuit 13 to output prediction code data (difference data). The difference data, as the prediction data from the prediction encoding circuit 14, is sent to a discrete cosine transform (DCT) circuit 15 which then generates coefficient data. The difference from the DCT circuit 15 are sent to a quantization circuit 16. The quantization circuit 16 quantizes the coefficient data with a pre-set quantization step size to generate quantized data to send the data to a variable length encoding circuit (VLC circuit) 17 and to a dequantization circuit 18. The variable length encoding circuit 17 variable-length encodes the quantized data to output variable-length encoded data to a counter. The dequantization circuit 18 dequantizes the quantized data from the quantization circuit 16 for restoring coefficient data and sends the restored coefficient data to an inverse discrete cosine transform circuit (IDCT circuit) 20. The IDCT circuit 20 decodes the coefficient data into difference data and sends the difference data to an addition circuit 21. The addition circuit 21 receives the difference data from the IDCT circuit 20 and the motion-compensated image data from the motion-compensation circuit 23 and sums the difference data to the prediction image data to generate prediction image data for the next input image data to transmit the prediction image data to the frame memory 22.

The second encoding circuit 40 has a delay circuit 43 for delaying the input image data and a set of frame memories 102 for storage of the input image data from the delay circuit 43. The information specifying the picture type from the picture type designating circuit 99 is sent to a motion vector detection circuit 101 which then detects the motion vector of the input image data based on the image data stored in the frame memory sets 102 and the information specifying the picture type. The second encoding circuit 40 has a frame memory 52 for storage of prediction image data. The prediction image data read out from the frame memory 52 is sent to a motion compensation circuit 53 where the prediction image data is motion-compensated based on the motion vector from the motion vector detection circuit 101. Also the sum of absolute values of the macro-block-based inter-frame differences are sent to an intra-frame/forward/backward/bidirectional prediction decision circuit 103 which then determines the prediction mode from the supplied sum of the absolute values of the inter-frame differences and sends the determined prediction mode to a prediction encoding circuit 44 for controlling the prediction encoding circuit 44 for switching between intra-frame/forward/backward/bidirectional prediction on the block basis.

The prediction encoding circuit 44 receives the motion-compensated image data from the motion compensation circuit 53 and the input image data and, based on the prediction mode from the prediction encoding circuit 44, computes the difference between the prediction image data and the input image data to output prediction image data (difference data). The differences data, as the prediction error from the prediction encoding circuit 44, is sent to, for example, a discrete cosine transform (DCT) circuit 45 which then generates coefficient data. The coefficient data from the DCT circuit 45 is sent to a quantization circuit 46 which then quantizes the coefficient data with a pre-set quantization step size to generate quantized data. The generated quantized data is sent to a variable length encoding (VLC) circuit 47 and to a dequantization circuit 48. The variable length encoding circuit 47 receives the prediction mode determined by the intra-frame/forward/backward/bidirectional prediction decision circuit 103 and the motion vector from the motion vector detection circuit, in addition to the quantized data from the quantization circuit 46, and variable-length encodes the supplied data to output the resulting variable-length encoded data to a transmission buffer 49. The dequantization circuit 48 dequantizes the quantized data from the quantization circuit 46 to restore the coefficient data which is suppled to, for example, an inverse discrete cosine transform (IDCT) circuit 50. The IDCT circuit 50 decodes the coefficient data into difference data and sends the difference data to an addition circuit 51. The addition circuit 51 receives the difference data from the IDCT circuit 50 and the motion-compensated prediction image data from the motion compensation circuit 53 and sums the difference data to the prediction image data to generate prediction image data for the next input picture data, which is sent to the frame memory 52. The transmission buffer 49 transiently stores the variable-length encoded data from the VLC circuit 47 and outputs the stored data as transmission data at a pre-set bit rate. The transmission buffer 49 feeds back the information specifying the storage state of the buffer to a quantization scale setting circuit 33. The quantization scale setting circuit 33 controls the quantization circuit 46 based on the allocated code amount, generated code amount and on the feedback information. The output data is recorded on a recording medium 120, such as a disc, tape or a semiconductor memory, or transmitted via a transmission channel 110 to a receiving side. In addition, the transmission data (encoded data) recorded on the recording medium is decoded by an image decoding apparatus, not shown, for restoration to the original image data.

Moreover, in the present image encoding apparatus, input image data from the motion vector detection circuit 11 is sent to the intra-frame information analysis circuit 60, which then finds the statistic information on the input image data every pre-set time duration. The statistic information is sent to the scene change detection circuit 30 which then detects a scene change based on the counter information, the information from the picture type designation circuit 100 specifying the picture type and the input statistic information, and sends the information specifying the result of detection to the picture type designation circuit 99. The picture type designation circuit 99 sends the information designating the picture type to a motion vector circuit 100 based on the information from the picture type designation circuit 101 and the detection information from the scene change detection circuit 30.

The present embodiment is further explained in detail.

Figure 7:
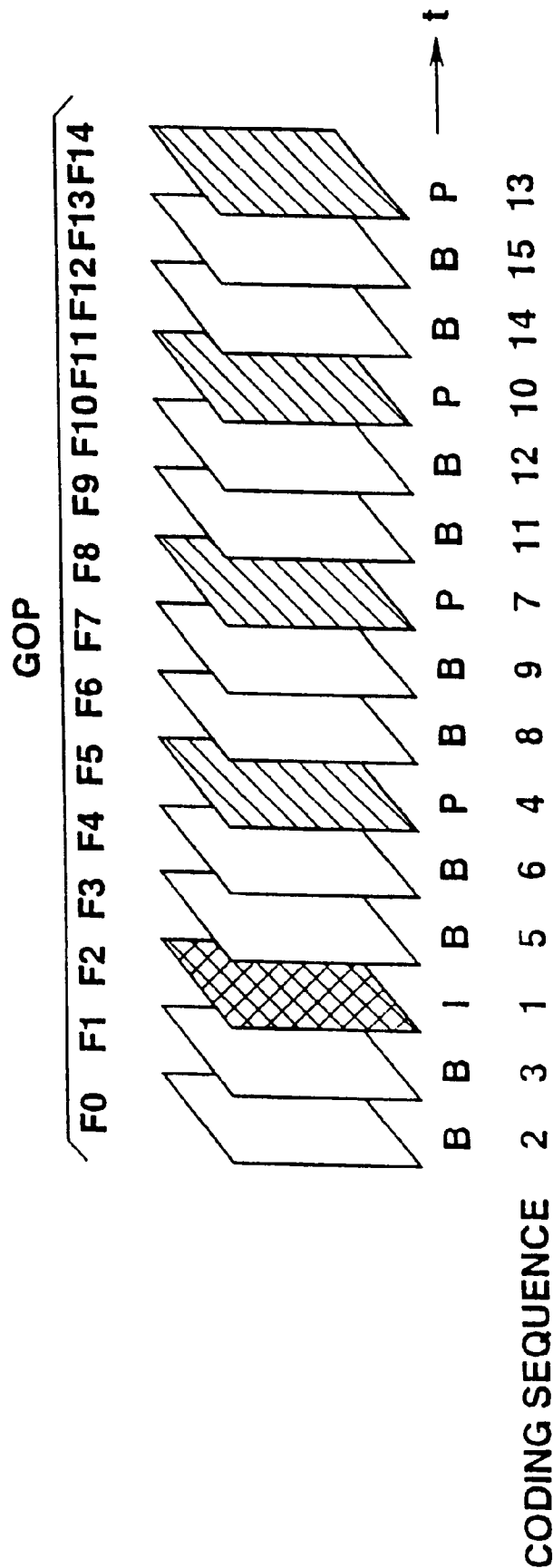
FIG. 7 illustrates the sequence of designation of picture types in a group-of-pictures and the encoding sequence.

The first encoding circuit 10 performs encoding on a sequence of input image data. That is, the first encoding circuit 10 periodically designates the picture type, based on the picture type designation information from the picture type designating circuit 100, as shown in FIG. 7, and sequentially executes prediction coding, DCT, quantization at a pre-set quantization step size and VLC. The scene change detection circuit 30 detects scene changes and sends the scene change information thus obtained to the picture type designation circuit 99. The second encoding circuit 40 performs encoding so that, by the information from the picture type designation circuit 99 specifying the picture type, the picture type scheduling will become optimum. The above sequence is assumed to be the totality of frames recorded on a picture recording medium, such as a motion picture or a television program. If the recording medium is split into plural recording areas, the scene may also be the totality of frames recorded in each subdivided recording area. The scene change detection circuit 30 detects scene changes, based on the amount of data per pre-set time duration of the variable length encoded data as a first bitstream from the first encoding circuit, information from the picture type designation circuit 100 specifying the picture type, an average value L and a variance V per pre-set time duration of the luminance signal Y of the input image signal as found by the intra-frame information analysis circuit 60, an average value R per pre-set time duration of a chroma signal Cr and an average value M per pre-set time duration of the amount of motion vector, for finding the designation of the picture types for one sequence per pre-set time duration. The second encoding circuit 40 again performs predictive coding, DCT transform, quantization and VLC in the input picture data, based on the picture type designating information from the picture type designation circuit 99, for generating the variable-length encoded data as a second bitstream. The second encoding circuit 40 quantizes the input image data with the quantization step size derived from the above encoding bit rate.

In the above-described MPEG, a pre-set number of pictures are grouped together in a GOP and encoded on the GOP basis. An illustrative example of the operation of the first encoding circuit 10 constituting the picture encoding apparatus of the first embodiment is now explained by taking an exemplary case in which pictures are designated on the GOP basis shown in FIG. 7.

The I-picture is encoded based only on itself, while the P-picture is encoded based on a previous reference frame which is an I- or P-picture, and the B-picture is prepared from previous and succeeding reference frames. If the input image and the picture types are designated in the sequence of frames F0 to F14 in FIG. 7, encoding is done in a sequence indicated by the coding sequence shown in FIG. 7. That is, the input frames are encoded in the sequence of F2, F0, F1, F5, F3, F4, F8, F6, F7, F11, F9, F10, F14, F12 and F13.

The motion vector detection circuit gets the input image data and the picture type information, judges when the input image is encoded and, when time is ripe for encoding, takes out the image from the frame memory 12 to derive the motion vector.

A quantization circuit 16 of the first encoding circuit 10 of FIG. 6 quantizes the coefficient data supplied from the DCT circuit 15, using the quantization step size of, for example, 1, for generating the quantized data. The counter 31 counts the amount of the variable-length coded data obtained on variable-length encoding the quantized data (first bitstream) for a preset unit time, for example, every frame, in order to find the amount of generated code y from frame to frame. The image analysis or intra-frame information analysis circuit 60 finds the average value L and variance V of the luminance signal Y in the frame and the average value R of the chroma signal Cr while finding the average value M of the amount of motion vector for a macro-block.

The scene change detection circuit 30 measures the amount of generated code y in the first encoding circuit 10 and observes the state of the inter-frame differences of respective parameters taking into account with which picture type the frame has been encoded. The values of the inter-frame difference and the pre-set values are compared to each other and, based on the results of comparison, whether or not scene change has occurred is detected.

Referring to FIGS. 8 to 11, several examples of the illustrative methods for scene change detection are explained.

Figure 8:
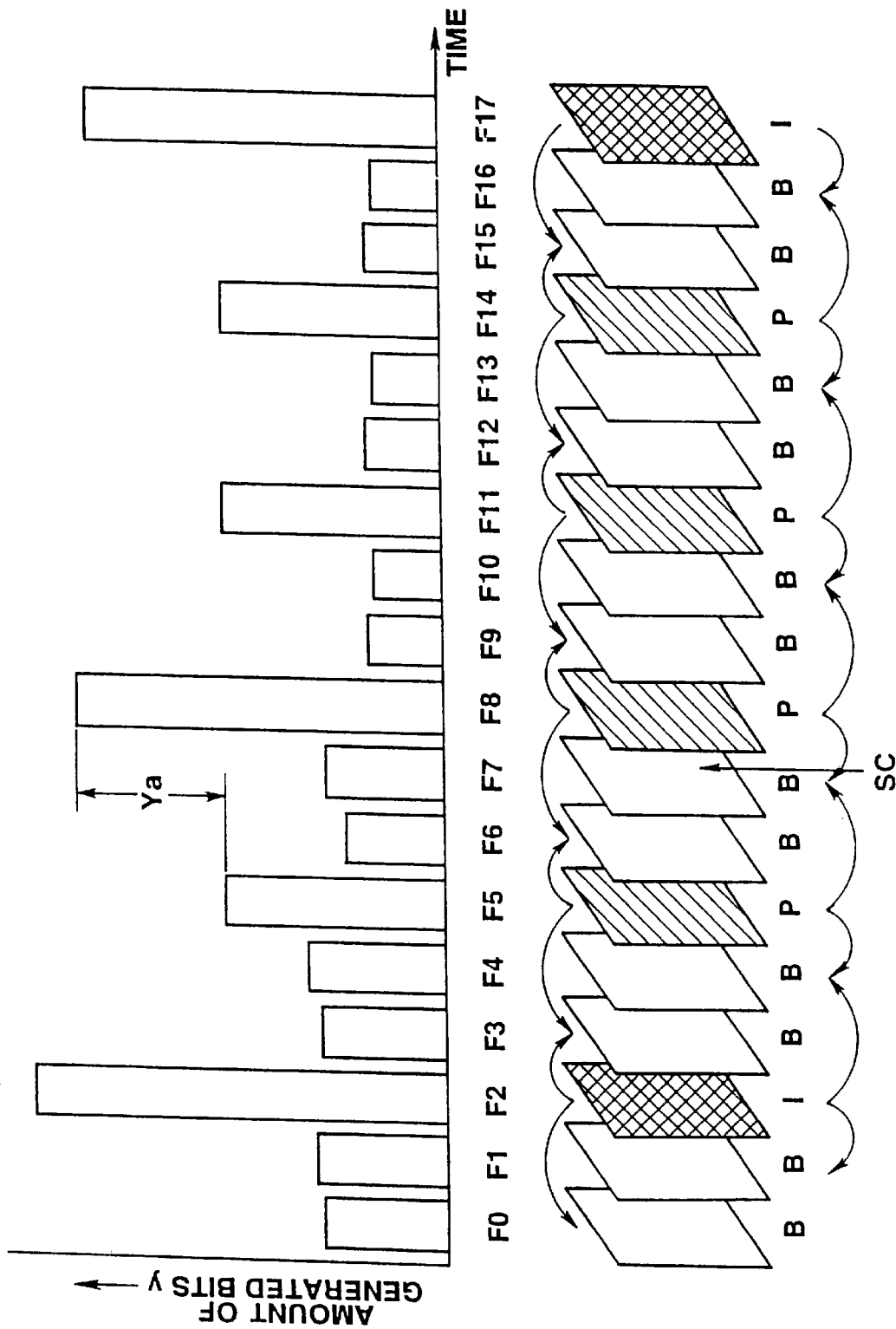
FIG. 8 shows a first illustrative example of scene change detection.

In the illustrative example of FIG. 8, scene changes are detected using changes in the amount of generated codes y from picture to picture on the basis of the variance or difference of the amount of generated bits y between two P-pictures. Assuming that the current picture is a frame F8 of the P-picture in FIG. 8, a difference Ya between the amount of generated bits y for this frame F8 and the amount of generated bits y for the previous P-picture of the frame F5 of FIG. 8 is found. If the difference Ya exceeds a pre-set threshold value, it is assumed that a scene change has occurred between these P-pictures, that is between the frames F5 and F8 of FIG. 8, and that a scene change C has been found in the frame F8 as the current P-picture.

Figure 9:
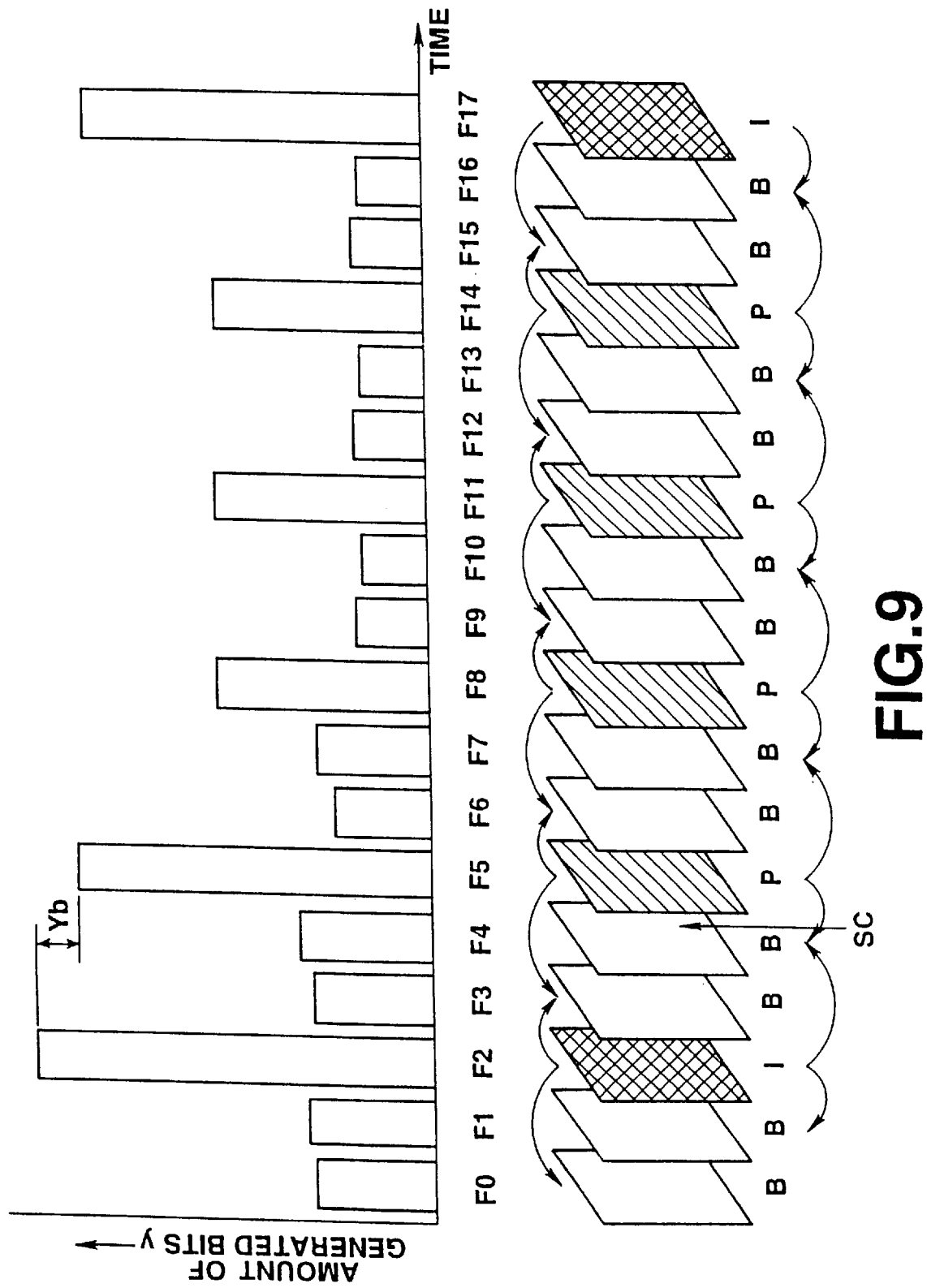
FIG. 9 shows a second illustrative example of scene change detection.

In the illustrative example of FIG. 9, a scene change is detected responsive to the variance or difference between the amount of generated bits y for the I-picture and the amount of generated bits y for the subsequent P-picture. That is, if the current picture is a P-picture directly after the I-picture (frame F5 of FIG. 9), the difference between the amount of generated bits y of the P-picture and the amount of generated bits y of the previous I-picture (frame F2 in FIG. 7) is calculated. If this difference Yb is within a range of a pre-set threshold, it is assumed that a scene change has occurred between these I- and P-pictures, that is between the frames F2 and F5 of FIG. 9, and that a scene change has been found at the frame F5 as the current P-picture.

Figure 10:
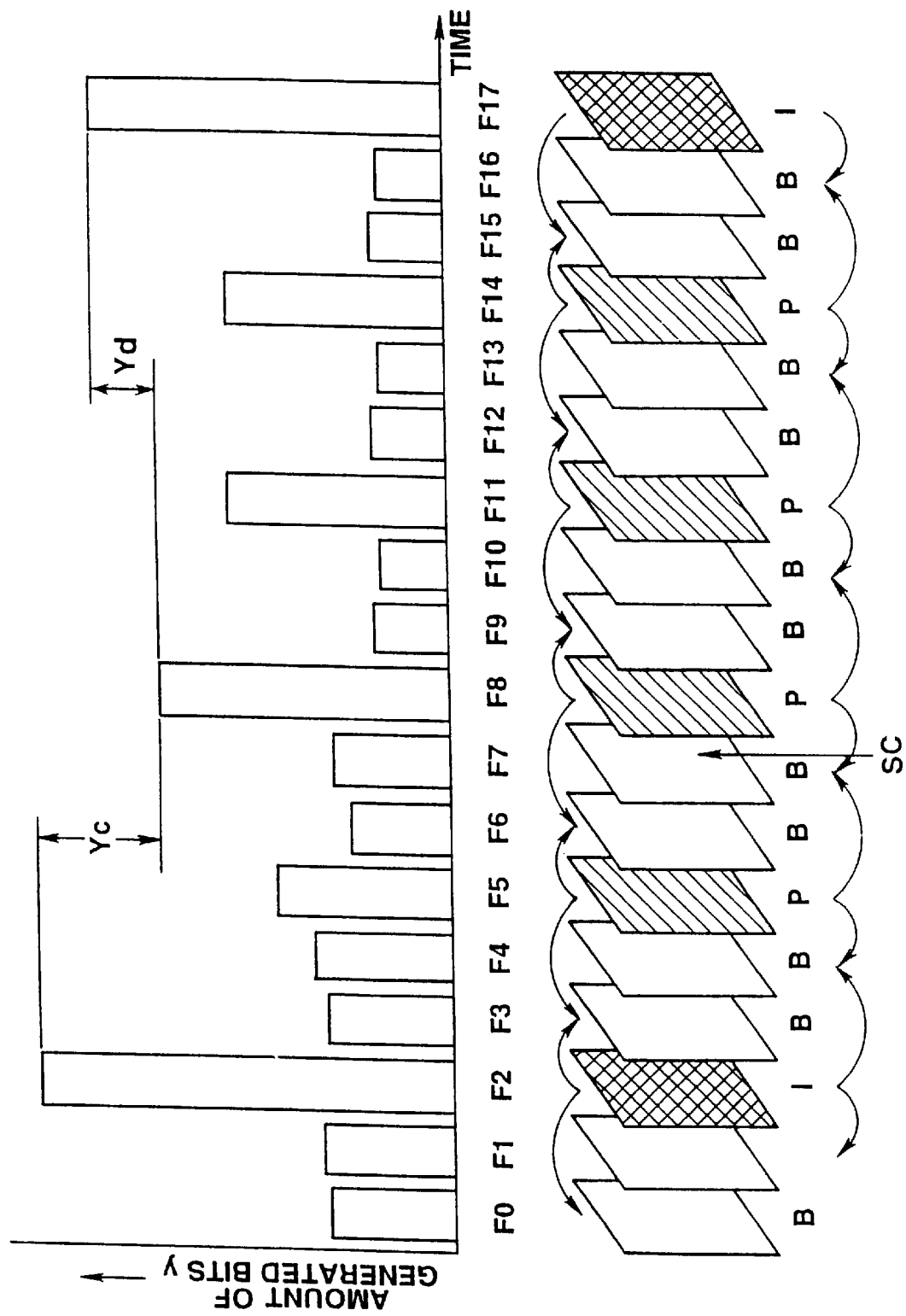
FIG. 10 shows a third illustrative example of scene change detection.

FIG. 10 shows an illustrative example of finding a variance or a difference of the amount of generated bits y between a P-picture and previous and succeeding I-pictures for detecting a scene change. That is, if the current picture is the frame F8 of the picture in FIG. 10, the difference between the amount of generated bits y in this frame F8 and the frames F2 or F17 of FIG. 10, which are I-pictures preceding or succeeding the P-picture. If the difference Yc or Yd, is within a pre-set range, it is assumed that a scene change has occurred between the P-pictures, and that a scene change has been found at the current picture.

Figure 11:
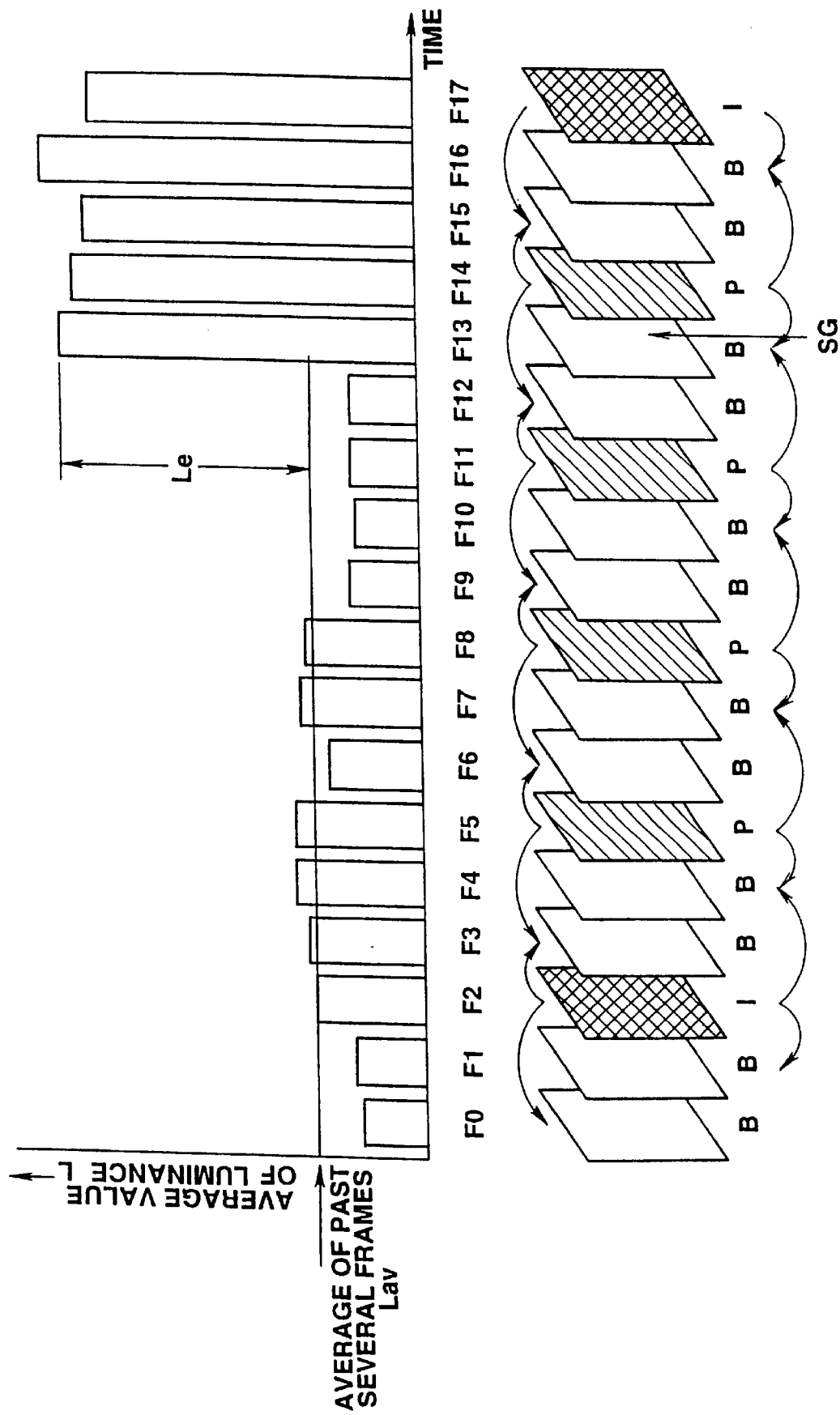
FIG. 11 shows a fourth illustrative example of scene change detection.

FIG. 11 shows an instance in which scene change detection is done using an average value L of luminance values of a picture which is the information from the intra-frame information analysis circuit 60. That is, if the current picture is the frame F13, and the difference Le from the average value Lav of the luminance of a pre-set plural number of frames preceding the current picture has exceeded a pre-set threshold value, it is assumed that a scene change has occurred in the frame F13 which is the current picture, and that a scene change has been found at the current picture.

The picture type designation circuit 99 performs picture designation for the second encoding based on the information from the above scene change detection circuit 30.

This picture type designation is done so that a reference frame directly after scene change is changed to an I-picture, while an I-picture directly previous to the scene change is changed to a P-picture, as explained with reference to FIG. 4B, or a reference frame directly after the scene change is changed to the I-picture, while the I-pict ure directly after the scene change is changed to the P-picture, as explained with reference to FIG. 5B. Alternatively, a reference frame directly after a scene change may be changed to an I-picture, and both I-picture before and after the scene change may be changed to a P-picture, as explained with reference to FIG. 5B. Meanwhile, no change s done if there is an I-picture before a P-picture directly after the scene change.

The operation of the second encoding circuit 40 is now explained. Since the circuitry other than the quantization scale setting circuit 33, delay unit 43, quantization circuit 46 and the transmission buffer memory 49 making up the second encoding circuit 40 operates in the same way as that constituting the above-described first encoding circuit 40, the explanation is not made for clarity.

The delay unit 43 delays the input image data for a time duration until a picture type signal is outputted from the picture type designation circuit 99. In the predictive encoding circuit 44 and the DCT circuit 45, the delayed input image data is processed with predictive encoding and DCT in accordance with the prediction mode supplied from the intra-frame/forward/backward prediction decision circuit 13, so that coefficient data is generated by the DCT circuit 45 and supplied to the quantization circuit 46.

If the buffer feedback information from the transmission buffer 49 indicates the impending overflow in the transmission buffer 49, the quantization scale setting circuit 33 enlarges the quantization step size for suppressing the overflow irrespective of the result of comparison between the above-mentioned allocated code amount and the generated code amount. Conversely, if the buffer feedback information from the transmission buffer 49 indicates the impending underflow in the transmission buffer 49, the quantization scale setting circuit 33 diminishes the quantization step size for suppressing the underflow irrespective of the result of comparison between the above-mentioned allocated code amount and the generated code amount.

In the conventional method for coping with scene changes, the overall number of the I-pictures is increased in a given sequence. For the I-picture, image signals for one frame are directly transmitted, thus necessitating a lot of the information for transmission. The result is that increase in the number of the I-pictures leads to lowered compression efficiency and degraded picture quality. With the above-described embodiment of the present invention, picture degradation due to scene change may be prohibited without increasing the number of I-pictures for improving the picture quality. In addition, only a small change in the GOP suffices, while the effect on the bit allocation, such as variable rate, may be minimized.

A modification of the present invention is now explained.

Figure 12A:
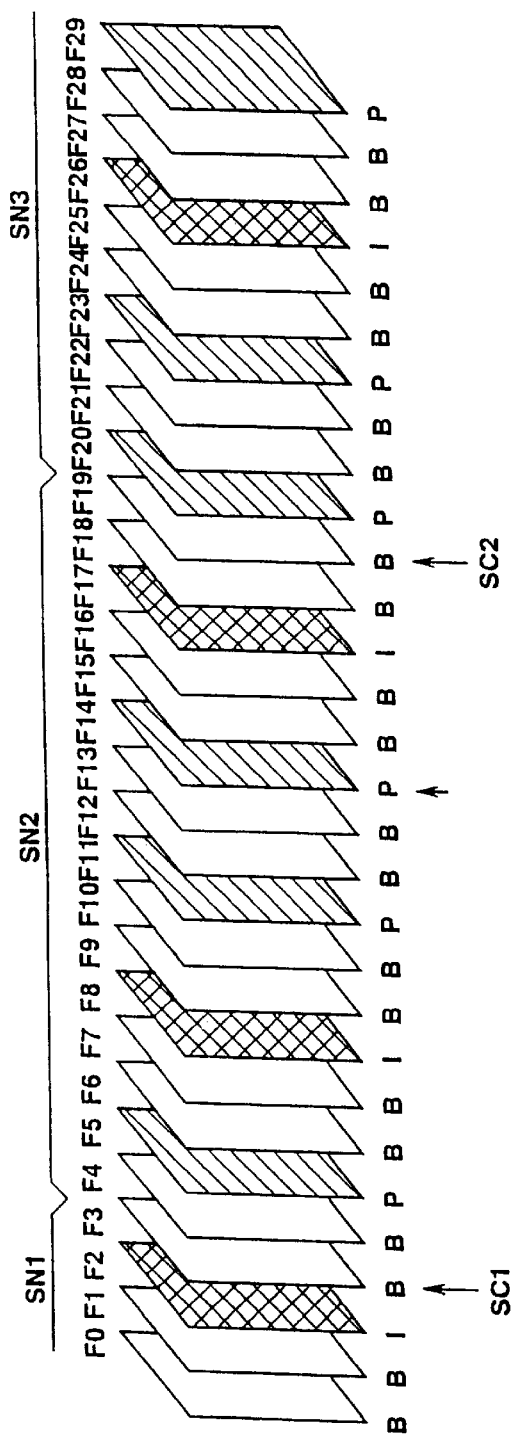
FIGS. 12A, 12B show an illustrative example of decreasing the number of I-pictures in the same scene.
Figure 12B:
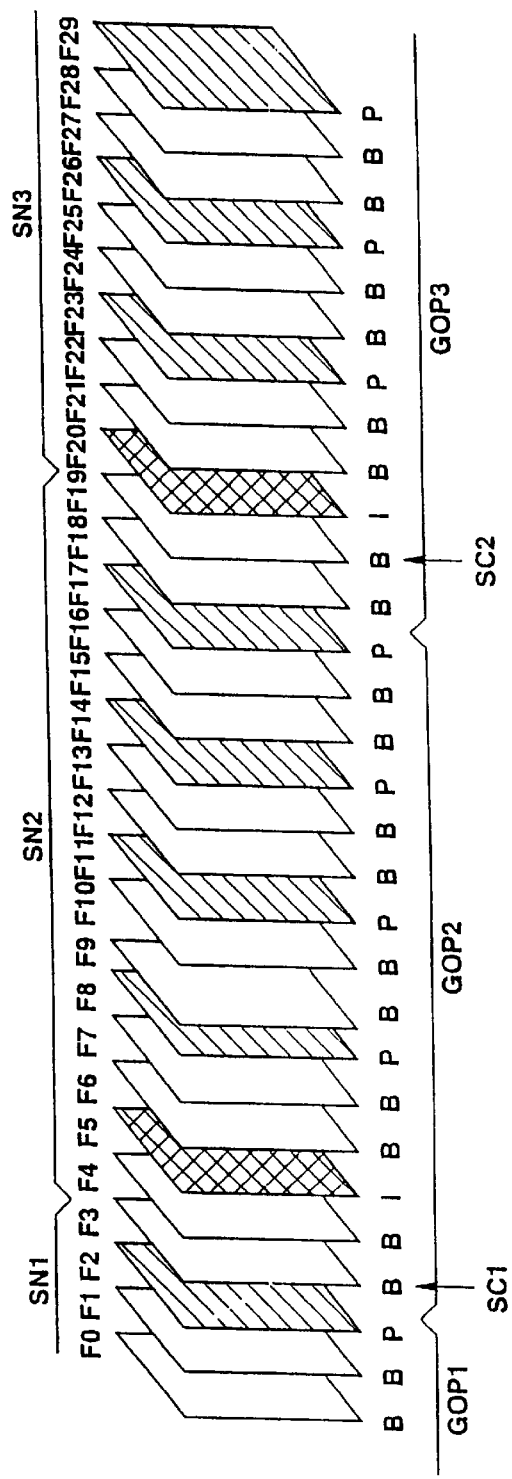

For example, if there are scene changes SC1, SC2 as shown in FIG. 12A, and each such scene can be divided into SN1, SN2 and SN3, the first picture (frame F5 or frame F20) after scene change is changed to an I-picture. Then, until a next scene change is detected, the I-picture (frames F8, F17 or F26) may be changed to a P-picture for diminishing the number of the I-pictures for minimizing the number of I-pictures in a scene.

By diminishing the number of I-pictures in the same scene, it becomes possible to improve the compression efficiency for improving the picture quality.

The present invention is not limited t the above-described embodiments. For example, the picture construction or the number of frames in a group-of pictures (GOP) is not limited to those shown in the drawings. Various other modifications may be made without departing from the scope of the invention.

According to the present invention, since the scene changes in the input image signals are detected, the forward predictive-coded image directly after a detected scene change is changed to an intra-frame coded image, while at least one of intra-frame coded pictures before and after the detected scene change is changed to a forward predictively coded image, thus prohibiting the picture from becoming degraded in quality due to scene change. Moreover, the intra-frame coded picture with a significant amount of the encoding bits may be prevented from being increased in number for preventing the amount of the transmission of the information from being increased thereby improving the picture quality with minimum effect on bit allocation such as variable rate bit allocation.

In addition, the compression efficiency may be increased by decreasing the intra-frame coded picture in the same scene for improving the compression efficiency, thereby improving the picture quality.

Since various other modifications or examples of application may be made without departing from the purport of the invention, the embodiments given above are merely illustrative and are not to be construed for limiting the invention.

What is claimed is:

1. A picture encoding method in which an input picture signal is encoded in a pre-set sequence by one of a plurality of encoding modes including at least the intra-frame coding and forward predictive coding for generating encoded data including intra-frame coded picture and forward predictive-coded picture, comprising the steps of:

detecting a scene change in the input picture signal;

encoding the input image signal in accordance with at least one of the plural encoding modes including at least the intra-frame coding and forward predictive coding; and changing the forward predictive-coded picture directly after the detected scene change into only an intra-frame coded picture and changing only one of (i) the closest intra-frame coded picture located before the detected scene change, (ii) the first intra-frame coded picture located after the detected scene change, and (iii) the closest intra-frame coded picture located before the detected scene change and the first intra-frame coded picture located after the detected scene change to a forward predictive coded picture such that other intra-frame coded pictures located before and after the detected scene change are not changed to a forward predictive coded picture.

2. The picture encoding method as claimed in claim 1 wherein the changing step changes an intra-coded picture present temporally before the detected scene change to a forward predictive-coded picture.

3. The picture encoding method as claimed in claim 1 wherein the changing step changes an intra-coded picture present temporally after the detected scene change to a forward predictive-coded picture.

4. The picture encoding method as claimed in claim 1 wherein the changing step changes intra-coded picture present temporally before and after the detected scene change to forward predictive-coded pictures.

5. The picture encoding method as claimed in claim 1 wherein the changing step changes at least part of the intra-frame coded pictures in the same scene from the above scene change to the next scene change to forward predictive-coded pictures.

6. The picture encoding method as claimed in claim 1 wherein the detecting step measures, from frame to frame, the amount of generated bits generated on encoding with a fixed quantization size, and detects scene changes responsive to variation in the amount of generated bits between two forward predictive-coded pictures.

7. The picture encoding method as claimed in claim 1 wherein the detecting step measures, from frame to frame, the amount of generated bits generated on encoding with a fixed quantization size, and detects scene changes responsive to variation in the amount of generated bits between an intra-frame coded picture and a forward predictive-coded picture directly after the intra-frame coded picture.

8. The picture encoding method as claimed in claim 1 wherein the detecting step measures, from frame to frame, the amount of generated bits generated on encoding with a fixed quantization size, and detects scene changes responsive to variation in the amount of generated bits between a forward predictive-coded picture and an intra-frame coded picture which is past or future picture with respect to said forward predictive-coded picture.

9. The picture encoding method as claimed in claim 1 wherein the detecting step measures, from frame to frame, an average value of the luminance value in a frame, and detects a scene change responsive to the variation between an average value of several past frames and the value of the current frame.

10. A picture encoding apparatus in which an input picture signal is encoded in a pre-set sequence by one of a plurality of encoding modes including at least the intra-frame coding and forward predictive coding for generating encoded data including intra-frame coded picture and forward predictive-coded picture, comprising:

a unit for detecting a scene change in the input picture signal;

a unit for encoding the input image signal in accordance with at least one of the plural encoding modes including at least the intra-frame coding and forward predictive-coding; and a unit for changing the forward predictive-coded picture directly after the detected scene change into only an intra-frame coded picture and changing only one of (i) the closest intra-frame coded picture located before the detected scene change, (ii) the first intra-frame coded picture located after the detected scene change, and (iii) the closest intra-frame coded picture located before the detected scene change and the first intra-frame coded picture located after the detected scene change to a forward predictive coded picture such that other intra-frame coded pictures located before and after the detected scene change are not changed to a forward predictive coded picture.

11. The picture encoding apparatus as claimed in claim 10 wherein the changing unit changes an intra-coded picture present temporally before the detected scene change to a forward predictive-coded picture.

12. The picture encoding apparatus as claimed in claim 10 wherein the changing unit changes an intra-coded picture present temporally after the detected scene change to a forward predictive-coded picture.

13. The picture encoding apparatus as claimed in claim 10 wherein the changing unit changes an intra-coded picture present temporally before and after the detected scene change to forward predictive-coded pictures.

14. The picture encoding apparatus as claimed in claim 10 wherein the changing unit changes at least part of the intra-frame coded pictures in the same scene from the above scene change to the next scene change to forward predictive-coded pictures.

15. The picture encoding apparatus as claimed in claim 10 wherein the detecting unit measures, from frame to frame, the amount of generated bits generated on encoding with a fixed quantization size, and detects scene changes responsive to variation in the amount of generated bits between two forward predictive-coded pictures.

16. The picture encoding apparatus as claimed in claim 10 wherein the detecting unit measures, from frame to frame, the amount of generated bits generated on encoding with a fixed quantization size, and detects scene changes responsive to variation in the amount of generated bits between an intra-frame coded picture and a forward predictive-coded picture directly after the intra-frame coded picture.

17. The picture encoding apparatus as claimed in claim 10 wherein the detecting unit measures, from frame to frame, the amount of generated bits generated on encoding with a fixed quantization size, and detects scene changes responsive to variation in the amount of generated bits between a forward predictive-coded picture and an intra-frame coded picture which is past or future picture with respect to said forward predictive-coded picture.

18. The picture encoding apparatus as claimed in claim 10 wherein the detecting unit measures, from frame to frame, an average value of the luminance value in a frame, and detects a scene change responsive to the variation between an average value of several past frames and the value of the current frame.

19. A picture transmitting method in which an input picture signal is encoded in a pre-set sequence by one of a plurality of encoding modes including at least the intra-frame coding and forward predictive coding for generating encoded data including intra-frame coded picture and forward predictive-coded picture and for transmitting the generated the encoded data, comprising the steps of:

detecting a scene change in the input picture signal;

encoding the input image signal in accordance with at least one of the plural encoding modes including at least the intra-frame coding and forward predictive coding for generating encoded data including both the intra-frame coded pictures and the forward predictively-coded pictures; and changing the forward predictive-coded picture directly after the detected scene change into only an intra-frame coded picture and changing only one of (i) the closest intra-frame coded picture located before the detected scene change, (ii) the first intra-frame coded picture located after the detected scene change, and (iii) the closest intra-frame coded picture located before the detected scene change and the first intra-frame coded picture located after the detected scene change to a forward predictive coded picture such that other intra-frame coded pictures located before and after the detected scene change are not changed to a forward predictive coded picture for generating modified encoded data; and transmitting the thus changed encoded data as transmission data.

20. A recording medium decodable by a decoding apparatus and having thereon recorded signals decodable by said decoding apparatus, said recorded signals being generated by the following steps of:

detecting a scene change in the input picture signal;

encoding the input image signal in accordance with at least one of the plural encoding modes including at least the intra-frame coding and forward predictive coding for generating encoded data including both the intra-frame coded pictures and the forward predictively-coded pictures; and changing the forward predictive-coded picture directly after the detected scene change into only an intra-frame coded picture and changing only one of (i) the closest intra-frame coded picture located before the detected scene change, (ii) the first intra-frame coded picture located after the detected scene change, and (iii) the closest intra-frame coded picture located before the detected scene change and the first intra-frame coded picture located after the detected scene change to a forward predictive coded picture such that other intra-frame coded pictures located before and after the detected scene change are not changed to a forward predictive coded picture for generating modified encoded data.

\* \* \* \* \*